United States Patent
Beck

(10) Patent No.: US 6,564,531 B2
(45) Date of Patent: May 20, 2003

(54) BLOW MOLDED CONTAINER WITH MEMORY SHRINK CLOSURE ATTACHMENT AND METHOD OF MAKING THE SAME

(75) Inventor: Martin H. Beck, Amherst, NH (US)

(73) Assignee: DTL Technology Limited Partnership, Amherst, NH (US)

( * ) Notice: Subject to any disclaimer, the term of this patent is extended or adjusted under 35 U.S.C. 154(b) by 23 days.

(21) Appl. No.: 09/739,177

(22) Filed: Dec. 18, 2000

(65) Prior Publication Data

US 2001/0000373 A1 Apr. 26, 2001

Related U.S. Application Data

(62) Division of application No. 09/287,850, filed on Apr. 7, 1999.

(51) Int. Cl.[7] ............................................... B65B 51/10
(52) U.S. Cl. ............................. 53/478; 53/485; 53/486
(58) Field of Search ........................... 53/478, 485, 486, 53/487, 561, 289, 290; 493/102, 157

(56) References Cited

U.S. PATENT DOCUMENTS

| | | | |
|---|---|---|---|
| 29,651 A | 8/1860 | Leland .................... 220/309.1 |
| 117,236 A | 7/1871 | Taylor et al. ............... 215/356 |
| 174,821 A | 3/1876 | Johnson .................. 220/309.1 |
| 2,214,399 A | 9/1940 | Benson .................... 220/309.1 |
| 2,532,227 A | 11/1950 | Heath ........................ 220/610 |
| 3,086,679 A | 4/1963 | Bijvoet ...................... 220/254 |
| 3,296,345 A | 1/1967 | Dietz ........................... 264/98 |
| 3,307,602 A | 3/1967 | Boster ........................ 220/254 |
| 3,409,710 A | 11/1968 | Klygis .......................... 264/98 |
| 3,504,817 A | 4/1970 | Heider ......................... 215/38 |
| 3,694,540 A | 9/1972 | Slan ............................ 264/230 |
| 3,791,098 A | 2/1974 | Webster ........................ 264/96 |
| 3,888,347 A | 6/1975 | Kramer ....................... 206/315 |
| 3,900,122 A | 8/1975 | Dichter ......................... 215/31 |
| 4,000,839 A | 1/1977 | Tecco et al. ................. 222/540 |
| 4,002,263 A | 1/1977 | Marcellini ................... 220/378 |
| 4,033,472 A | 7/1977 | Aichinger .................... 215/256 |
| 4,040,233 A * | 8/1977 | Valyi |
| 4,056,914 A * | 11/1977 | Mnilk et al. |
| 4,108,937 A | 8/1978 | Martineu et al. ............. 264/89 |
| 4,226,334 A | 10/1980 | Weiler et al. ................ 215/355 |
| 4,264,010 A | 4/1981 | Yoshiga et al. ............. 206/497 |

(List continued on next page.)

FOREIGN PATENT DOCUMENTS

| | | | | |
|---|---|---|---|---|
| CH | 119342 | 3/1927 | ................. | 220/620 |
| FR | 575292 | 1/1924 | ................. | 220/610 |
| IT | 291071 | 11/1935 | ................. | 220/610 |

Primary Examiner—Eugene Kim
(74) Attorney, Agent, or Firm—Davis & Bujold, P.L.L.C.

(57) ABSTRACT

A blow molded, bi-axially oriented plastic canister or container has a generally cylindrical body, a bottom, and a tapering upper portion, which terminates at a wide mouth or opening surrounded by a radially outwardly directed annular flange having an inwardly facing corner. A generally disc-shaped closure insert having a circumferential rim and a dispensing outlet is placed across the opening such that the closure rim is generally fitted into the corner of the annular flange. Heat or some other form of energy is applied to the entirety of the annular flange, which in response shrinks to tightly conform to and engage the closure rim, forming a circumferential seal. The dispensing outlet may be provided with an outlet closure, such as a screw cap or the like. Also, a sealant may be disposed between the annular flange and the closure rim before the heat is applied in order to form an enhanced seal. Furthermore, mechanical devices may be used to shape the flange during or after heating to further enhance the rim-flange seal or to provide additional sealing configurations.

12 Claims, 9 Drawing Sheets

U.S. PATENT DOCUMENTS

| | | | |
|---|---|---|---|
| 4,265,852 A | 5/1981 | Sauer | 264/512 |
| 4,268,336 A | 5/1981 | Piltz et al. | 156/244.13 |
| 4,349,399 A | 9/1982 | Obrist et al. | 156/86 |
| 4,476,084 A | 10/1984 | Takada et al. | 264/342 |
| 4,566,923 A | 1/1986 | Mueller | 264/230 |
| 4,576,843 A | 3/1986 | Beck et al. | 264/530 |
| 4,578,028 A | 3/1986 | Dirksing et al. | 264/533 |
| 4,607,757 A * | 8/1986 | Lecinski | |
| 4,642,254 A | 2/1987 | Walker | 264/342 |
| 4,787,531 A | 11/1988 | Gress | 220/324 |
| 4,790,117 A | 12/1988 | Hansen | 264/524 |
| 4,803,829 A * | 2/1989 | Scheidegger | |
| 4,813,807 A | 3/1989 | Mead | 403/273 |
| 4,984,415 A | 1/1991 | Kuroda | 53/478 |
| 5,054,272 A * | 10/1991 | Dundas | |
| 5,120,175 A | 6/1992 | Arbegast et al. | 411/501 |
| 5,199,153 A | 4/1993 | Schulte-Ladbeck | 29/447 |
| 5,200,587 A | 4/1993 | Fang | 219/10.53 |
| 5,248,533 A | 9/1993 | Sugiura et al. | 264/530 |
| 5,275,767 A | 1/1994 | Micciche | 264/23 |
| 5,322,662 A | 6/1994 | Benioff et al. | 264/533 |
| 5,351,462 A | 10/1994 | Anderson et al. | 264/524 |
| 5,378,421 A | 1/1995 | Salame | 264/230 |
| 5,484,244 A | 1/1996 | Glovan et al. | 411/424 |
| 5,585,065 A | 12/1996 | Nakamaki et al. | 264/521 |
| 5,687,995 A | 11/1997 | Mori et al. | 285/21 |
| 5,826,739 A | 10/1998 | Valyi | 215/253 |
| 5,836,066 A | 11/1998 | Ingram | 29/90.7 |

* cited by examiner

BLOW MOLDED CONTAINER WITH MEMORY SHRINK CLOSURE ATTACHMENT AND METHOD OF MAKING THE SAME

This is a division of application Ser. No. 09/287,850, filed Apr. 7, 1999.

FIELD OF THE INVENTION

This invention relates to blow molded plastic containers, and more particularly, though not exclusively, to closures for blow molded hot fill plastic containers.

DEFINITION

Material memory, as used herein, is the propensity of materials, particularly plastics (especially polyesters, e.g. PET), to return to a previous shape or size upon the relief of internal stresses, produced, for example, by molecular orientation when blow molding an article from a preform, the relief usually being provided by the application of energy to heat the material to a stress relieving temperature.

BACKGROUND OF THE INVENTION

Bottles or containers made from polyesters, usually polyethylene terephthalate (PET) or other plastics, are well known, and provide a lighter, more economical, and typically stronger alternative to older, more traditional glass or metal containers.

PET containers are typically manufactured using plastic preforms in conjunction with a blow molding process. Such containers come in all shapes and sizes, may be wide-mouthed or narrow-mouthed, and are provided with numerous types of closures including, for example, screw-on closures and snap-on closures. Frequently, the containers' necks will be provided with complementary attachment means (neck finishes) for facilitating the attachment of the respective types of closures.

Wide mouth blow molded containers are often outfitted with screw-thread neck finishes via an injection stretch blow mold process, the neck finish being made during the initial injection molding process of the preform. One problem with wide mouth neck finishes and closures is that extra manufacturing steps may be necessary to ensure the neck area is as strong as the rest of the container. This is because during the stretch blow molding process the body of the container is biaxially oriented (thus increasing its relative strength), while the neck area is not (because the injection molding process does not significantly orient the plastic). Intermediate heat treatment steps and the like may be necessary to ensure proper strength throughout the container.

Alternatively, wide mouth containers may be provided with a simpler neck finish once the blow molding process is completed by mechanically manipulating the neck area. For example, the neck rim may be formed into a circumferential, rolled lip, onto which a complementary closure is simply snapped into place. Such a closure, though, may not always provide an adequate seal, and it may not be desirable to have such a wide product dispensing opening in the container once the closure is removed.

SUMMARY OF THE INVENTION

Wherefore, it is an object of the present invention to overcome the aforementioned problems and drawbacks associated with the prior art designs by providing a novel and advantageous closure for wide mouth, plastic blow molded containers.

Another object of the invention is to provide a method for closing wide mouth containers which allows for a variety of closure types.

Another object of the present invention is to provide a wide mouth blow molded container having a permanently secured wide mouth closure.

Yet another object of the invention is to provide a simpler and more economic method of closing and producing wide mouth containers having uniform or near uniform container strength without the necessity of many additional manufacturing steps.

Another object of the present invention is to provide a wide mouth blow molded container wherein the closure may be a compound closure having multiple and/or alternative closure parts.

Yet another object of the invention is to provide a wide mouth container closure having an enhanced seal, and the potential to provide numerous types of seals.

The present invention provides, in combination, a container and closure comprising: a container defining an opening and having at least one portion with a material memory; and a closure insert defining a closure periphery, the closure insert being secured in the container by material shrinkage produced by relief of stresses in the material memory container portion to conform that portion to the closure periphery.

The present invention also provides a method of closing a container comprising the steps of: providing a container defining an opening and having at least one portion having a material memory; providing a closure defining a closure periphery; positioning the closure in the container with at least a portion of the closure periphery being proximate the material memory portion; and heating the material memory portion sufficient to cause the material memory portion to shrink and thereby engage and conform to the closure periphery.

The present invention also provides a method of manufacturing a container having a closure, the method comprising the steps of: blow molding a container comprising a body and an accommodation element from a thermoplastic material, the accommodation element comprising an annular flange having a horizontal, radially extending portion and a vertical, axially oriented portion extending upwards from an edge thereof, the horizontal and vertical portions defining an inwardly facing, circumferential corner, and the material of the body and at least a portion of the accommodation element proximate the body being biaxially oriented via the blow molding process; trimming and removing a portion of the accommodation element above the vertical portion of the annular flange in order to provide a container opening defined by the annular flange; providing a closure insert having a closure periphery; positioning the closure insert across the container opening such that at least a portion of the closure periphery rests in the corner of the annular flange; and heating the annular flange sufficient to shrink the annular flange to engage and conform to the portion of the closure periphery resting in the corner of the annular flange.

The present invention also provides a method of closing a container comprising the steps of: providing a container having at least one generally planar portion, the container defining an opening, and the container having at least one flap integral with the at least one generally planar portion, the at least one flap extending beyond the opening, and the container having at least one portion having a longitudinal material memory, the at least one material memory portion being proximate a junction between the at least one flap and the at least one generally planar portion; and heating the material memory portion sufficient to cause the material memory portion to longitudinally contract, the at least one flap thereby generally folding over to at least partially cover the opening.

The present invention discloses a blow molded, biaxially oriented plastic canister or container having a generally cylindrical body, a bottom, and a tapering upper portion, which terminates at a wide mouth or opening surrounded by a radially outwardly directed annular flange. The annular flange includes a horizontal, disc-like portion and a vertical, cylindrical portion extending up from the horizontal portion. A generally disc-shaped closure insert having a circumferential rim and a dispensing outlet is placed across the opening such that the closure rim is generally fitted into a corner formed by the horizontal and vertical portions of the annular flange.

Heat or some other form of radiant energy is applied to the entirety of the annular flange, which, having been at least radially or circumferentially oriented during the blow molding process, shrinks in response to tightly conform to and engage the closure rim, forming a circumferential seal. The dispensing outlet may be provided with an outlet closure, such as a screw cap or the like, depending on the configuration of the provided dispensing outlet. Also, a sealing gasket or the like may be disposed between the annular flange and the closure rim before the heat is applied in order to form an enhanced seal. Furthermore, mechanical devices may be used to shape the flange during or after heating to further enhance the rim-flange seal or to provide additional sealing configurations.

BRIEF DESCRIPTION OF THE DRAWINGS

The invention will now be described, by way of example, with reference to the accompanying drawings, in which.

DESCRIPTION OF THE PREFERRED EMBODIMENTS

Turning to FIGS. 1–5, a detailed description of further embodiments of the present invention will now be provided.

Figure 1:
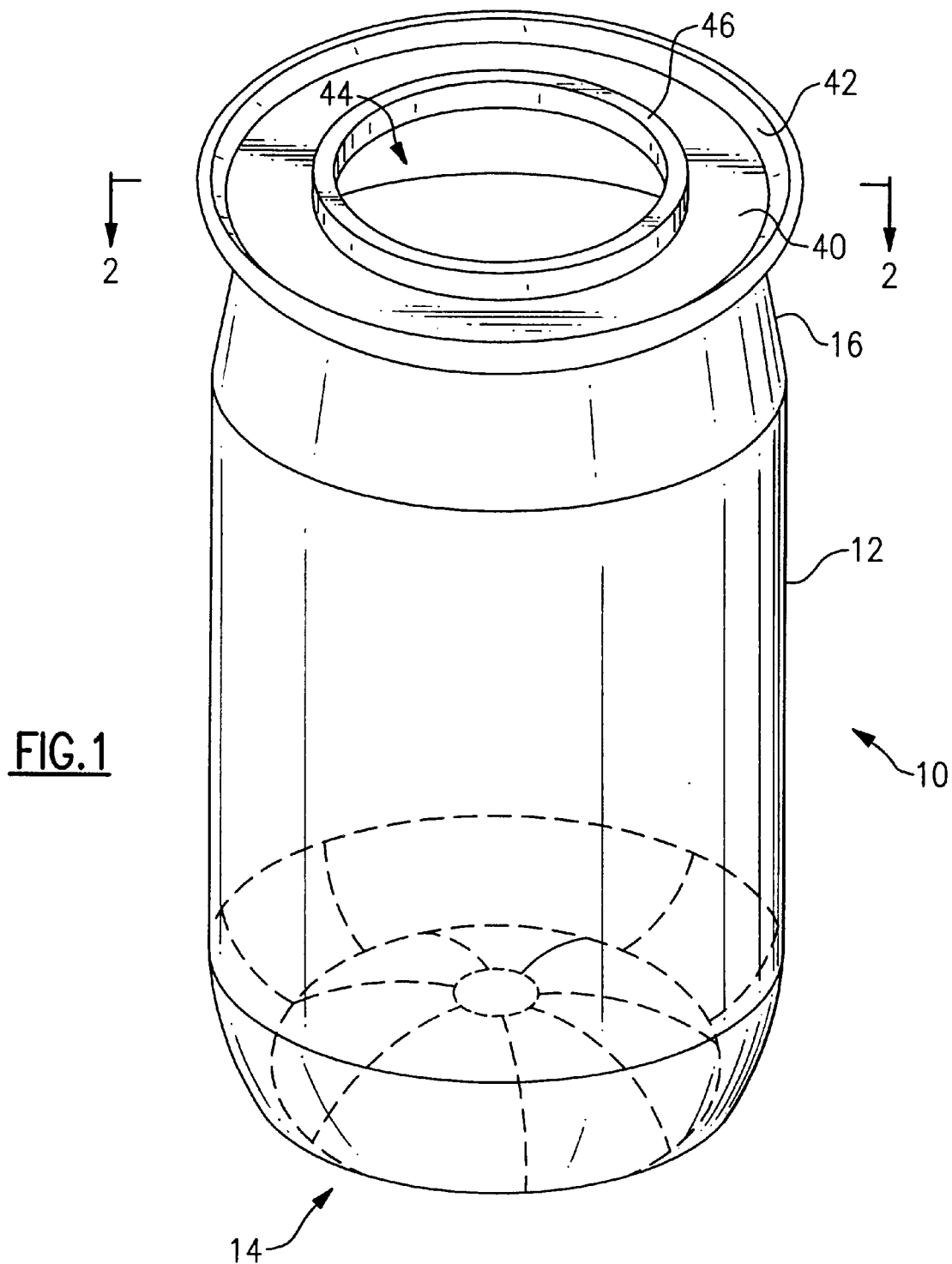
FIG. 1 is an elevational perspective view of a clear plastic blow molded container having a memory shrink closure attachment according to the present invention.
Figure 3:
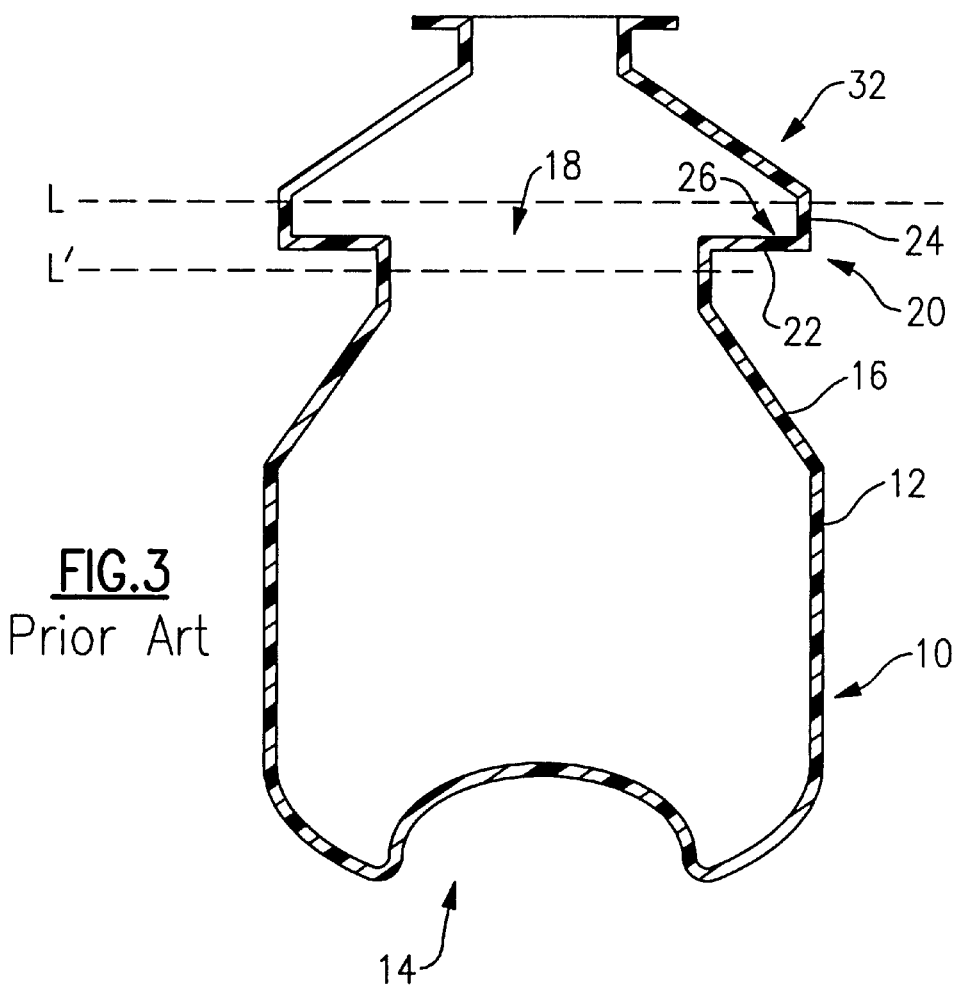
FIG. 3 is a cross-sectional view of the container during an intermediate manufacturing step, as known in the prior art.
Figure 4:
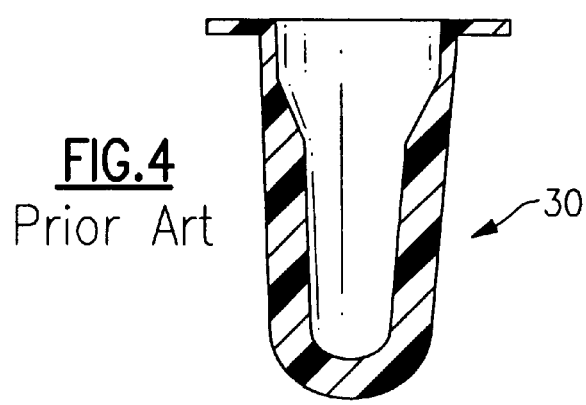
FIG. 4 is a cross-sectional view of a preform used to make the plastic container, as known in the prior art.
Figure 5:
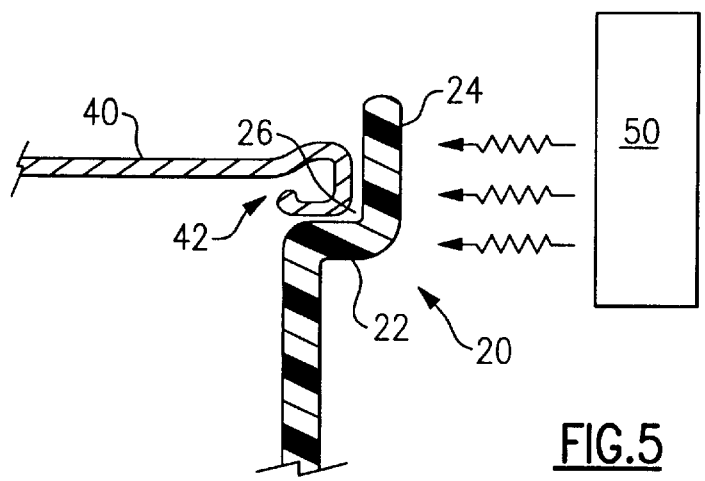
FIG. 5 is a cross-sectional detail view of the manufacturing process of the closure according to the present invention.

In FIG. 1, the container 10 is a blow molded, wide mouth plastic container having a generally cylindrical body 12 and a bottom 14. The bottom 14 may be of the modified champagne type so as to resist internal pressures. An upper part 16 of the body 12 tapers radially inwardly and axially upwardly, and terminates in a wide mouth or opening 18. As best seen in FIGS. 3 and 5, the opening 18 is surrounded by a radially outwardly directed annular flange 20 which initially includes a horizontal, disc-like portion 22 and a vertical, cylindrical portion 24 extending up from the horizontal portion to form a circumferential corner 26.

This container and a method for making the same is disclosed in U.S. Pat. No. 4,576,843 (the '843 patent), to Beck et al. In the '843 patent the wide mouth container 10 is formed from a small diameter preform 30 (see FIG. 4) as is customarily utilized in the blow molding of plastic containers, with the preform being of a materially lesser length than that of the resultant container. As shown in FIG. 3, in order to obtain the necessary biaxial orientation of the thermoplastic material throughout the container 10, an intermediate article of manufacture is produced. This is essentially the container 10 with an additional accommodation element portion 32, the accommodation element 32 being severed or trimmed from the container near line L and becoming reusable scrap. The resulting wide mouthed container 10 is thus completely biaxially oriented, and has the annular flange 20 once the accommodation element is removed.

In addition, in the generally cylindrical container 10 as shown, the outward radial expansion of the preform 30 during blow molding results in the container being radially inwardly internally stressed. That is, subsequent the blow molding process, the container material is molecularly oriented to offset a desire to contract circumferentially inward to its previous state. If energy is subsequently applied to a portion of the container material, the internal stresses will be relieved and that portion will actually contract circumferentially inwards. As defined above, this characteristic is known as material memory. Also, it should be noted that in the case of PET and most other plastics commonly used for plastic containers, once the material has returned to its original state according to its material memory, its morphology has typically been altered to a state of increased crystallinity. Thus, the material will no longer be effected by subsequent applications of energy. In this sense, the material is permanently deformed.

Figure 9:
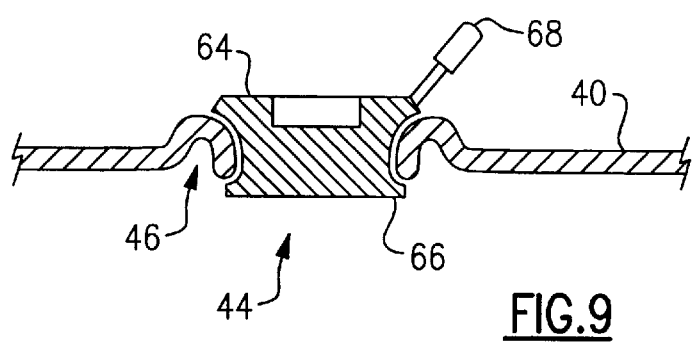
FIG. 9 shows a cross-sectional view of an alternative configuration for a dispensing outlet and closure rim, further including a closure cap.

Once the container 10 has been blow molded and trimmed, it is ready to receive the closure insert 40. The closure insert 40, as best seen in FIG. 1, is generally disc-shaped and has a circumferential closure rim 42 (the rim defining a periphery of the closure insert), the outer edge of which is typically rounded. The closure insert 40 also includes a dispensing outlet 44, which may be a hole or void disposed near the center of the closure insert 40 as shown in FIG. 1, though it may be any shape or size depending on the particular application. The dispensing outlet 44 may have an outlet rim 46, which can be configured to engage a snap-on closure cap, a screw-on closure, a non-resealable closure or the like, with or without further tamper-proof features such as sealing discs and tear off skirts. One preferred outlet rim/closure cap configuration is shown in FIG. 9, as discussed below.

The closure insert 40 is preferably made from a metal such as aluminum or steel, but may also be made from plastic, cardboard, plastic lined metal, etc. Because the manufacturer of such a closure insert is known to those of ordinary skill in the art, further detail will not be provided herein.

Figure 2A:
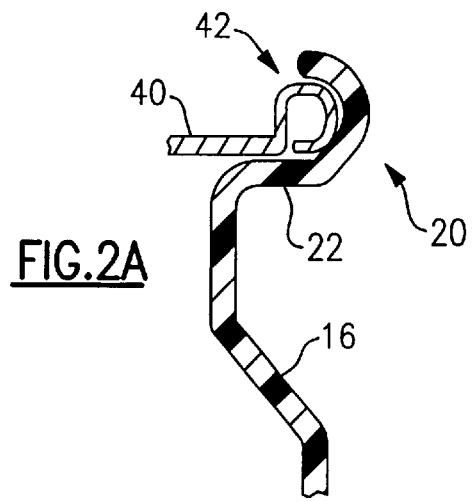
FIG. 2 is a cross-sectional view (with detail) of the container of FIG. 1 taken across section line 2—2.
Figure 2:
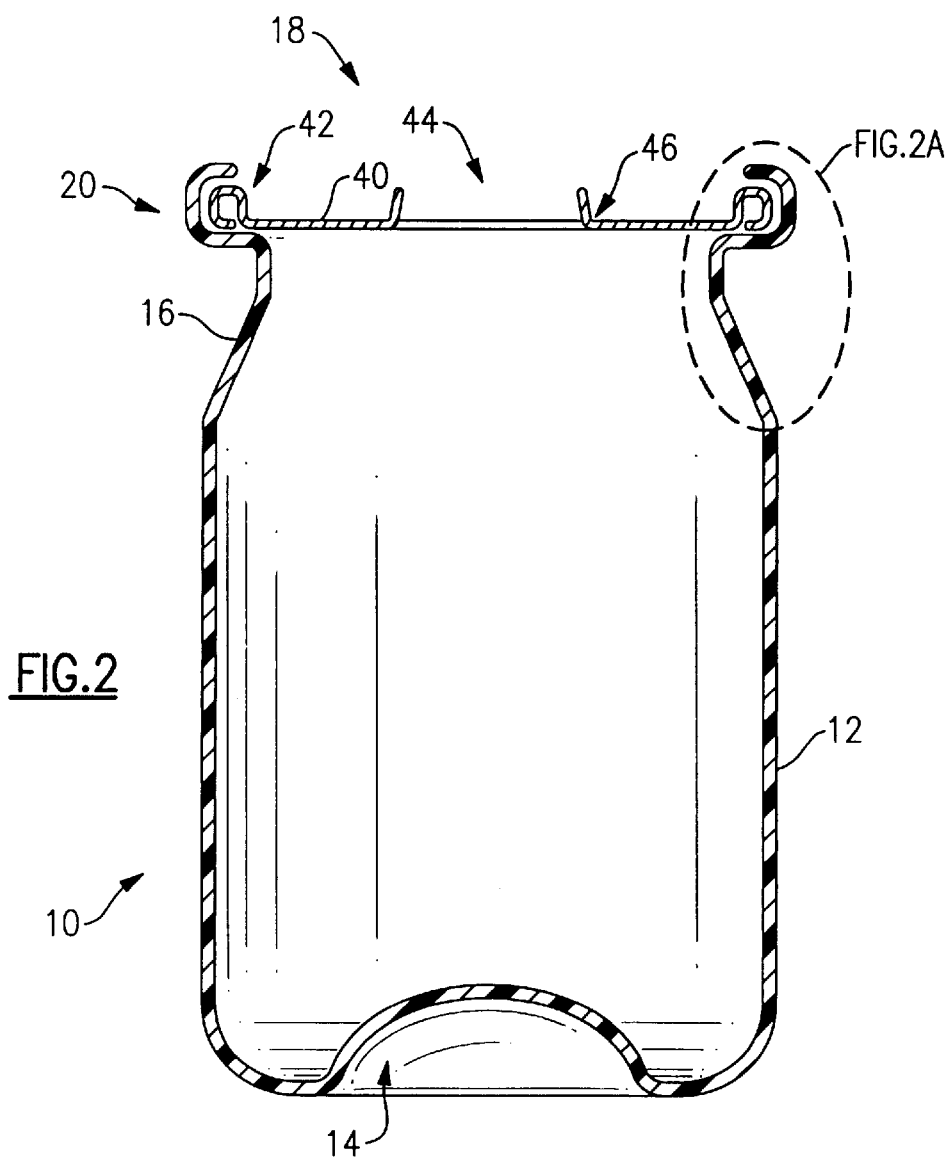

FIG. 5 shows the first steps in the process of attaching the closure insert 40 to the wide mouth container 10. The closure insert 40 is first placed across the opening 18 such that the closure rim 42 rests in the corner 26 between the horizontal flange portion 22 and the vertical flange portion 24. Next, a heater 50 (or some other energy source) is used to apply heat to the flange 20 as indicated by the arrows in FIG. 5. This causes the plastic material, which retains a material memory of its previous, preform configuration, as discussed above, to shrink inwards. The flange thus contacts, wraps around, and conforms to the closure rim 42, providing a tight seal (as best seen in FIG. 2). Ideally the heater 50 is shaped (for example, as a hollow cylinder) so that the entirety of the flange 20 may be heated at the same time.

As mentioned above, once the material of the flange 20 has contracted around the closure insert, it is in a state of permanent deformation. Absent the application of catastrophic force (mechanical cutting, fire, etc.), the closure insert 40 is thus permanently affixed to the container. However, it should be remembered that containers with removable closures may be provided according to the present invention, as described below.

Figure 6:
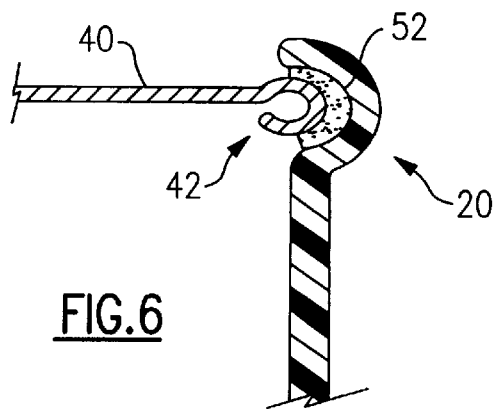
FIG. 6 is a cross-sectional detail view of the container of FIG. 2 showing the placement of an optional sealant.

Referring now to FIG. 6, a sealant 52 may be disposed between the closure rim 42 and the annular flange 20 in order to provide an enhanced circumferential seal. The sealant 52 may be a foam, plastic or rubber gasket, or some form of adhesive, hardening sealant, or the like. During the manufacturing process, the sealant 52 is placed into the flange corner 26 before the closure insert 40 is positioned across the opening 18. If a liquid or semi-solid adhesive or the like is used as the sealant 52, it may be sprayed or squirted into the corner 26 via a dispensing nozzle or some other applicator (not shown). Once the sealant 52 is in place, the closure insert 40 is put into place, and the flange 20 heated as described above. Alternatively, the closure rim 42 may be provided with sealant 52 prior to placement, and the entirety placed into the flange corner 26.

Figure 7:
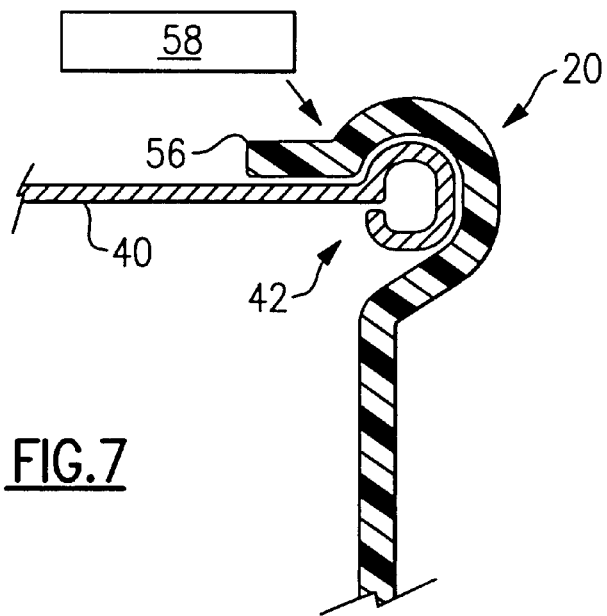
FIG. 7 is a cross-sectional detail view of the container of FIG. 2 showing an additional embodiment of the present invention.

FIG. 7 shows an additional embodiment of the present invention wherein the annular flange 20 includes a flange extension 56 that extends fully over and beyond the closure rim 42. Such a feature provides an enhanced, stronger seal between the container 10 and closure insert 40. Since the flange extension 56 may not strictly conform to the shape of the closure insert (around the area where the closure rim 42 meets the closure insert 40 proper), a pressure tool 58 may be used to shape the flange extension 56 via a force applied in a direction as indicated by the arrow in FIG. 7. The pressure tool 58 may be a circular or disc-shaped press, in which case the direction of the force would be straight down. A sealant 52 (not shown in FIG. 7) may also be provided to enhance the seal of this embodiment.

Figure 8:
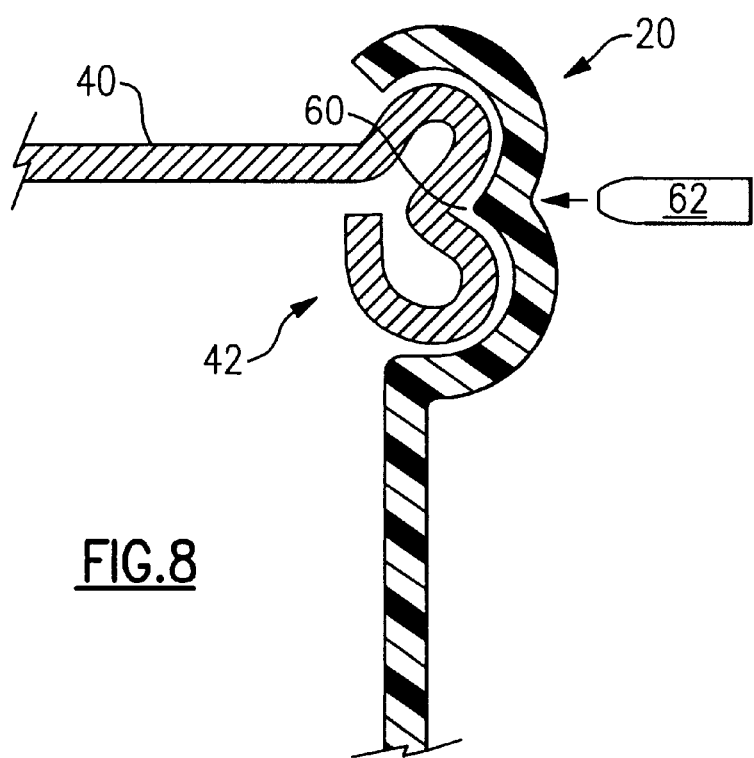
FIG. 8 is a cross-sectional detail view of the container of FIG. 2 having an alternative rim and sealing configuration.

An additional embodiment of the present invention is shown in FIG. 8. Here, the closure rim 42 is provided with an outwardly facing, circumferential groove 60. During or after heating of the flange 20, a second pressure tool 62 (preferably provided as one or more shaped rollers) may be used to press the flange 20 into the rim groove 60 via a force applied in a direction as indicated by the arrow in FIG. 8. Again, a sealant 52 may be used with the configuration of this embodiment.

Turning now to FIG. 9, a preferred embodiment of the dispensing outlet and outlet rim is shown in cross-section. Here, the outlet rim 46 is formed via an initially upwardly extending curl of the closure insert 40 around the dispensing outlet 44. Such a curl can be manufactured by a metal forming tool, for example, as known to those with skill in the art. Additionally, a closure cap 64, provided with features dimensioned to tightly engage the outlet rim 46 (a lower circumferential sealing lip 66 for example), may be provided to disengagingly seal the dispensing outlet 44. The closure cap 64 may be provided with a pull tab 68 to facilitate removal. Of course, the type of closure cap provided will depend on the particular application. For example, if the container is to be used to hold spices, the closure cap may have shaker/sifter holes disposed therein.

Although the present invention has been illustrated for use with a container having a particular configuration, one of ordinary skill in the art will appreciate that the present invention could be used with other containers without departing from the spirit and scope of the invention. For example, containers without tapering top portions 16 could be used, or containers having wider mouths, or containers having different shapes or sizes.

Also, although the present invention has been shown in use with a container having an annular flange with a horizontal portion and a vertical portion, one of ordinary skill in the art will appreciate that the closure attachment could be used on a container with only a horizontal flange by providing a pressure or guidance tool that would guide the flange over the closure rim during heating/shrinking.

Also, although the present invention has been illustrated in conjunction with a generally disc-shaped closure insert, one of ordinary skill in the art will appreciate that any shaped closure insert could be used without departing from the spirit and scope of the invention, provided that the closure insert has at least some sort of rim portion. It should also be appreciated that the closure rim does not have to be any one particular shape (as was shown in the embodiment of FIG. 8, for example).

Figure 10A:
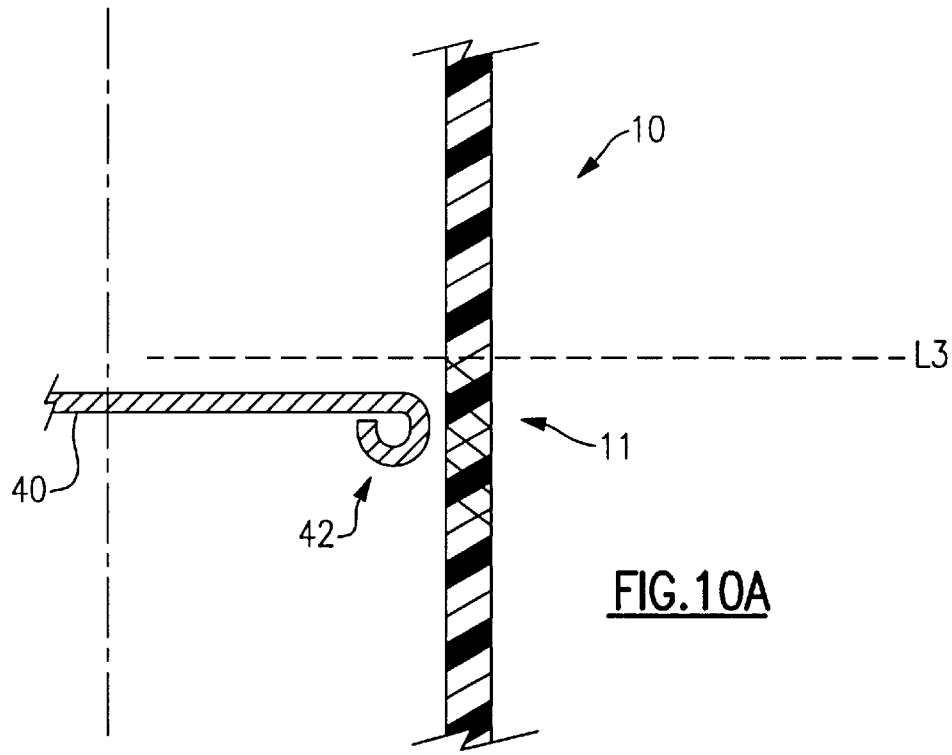
FIG. 10A is a fragmentary cross-sectional view illustrating one of the inventive elements of the present invention and a first step in exemplary embodiment thereof.
Figure 10B:
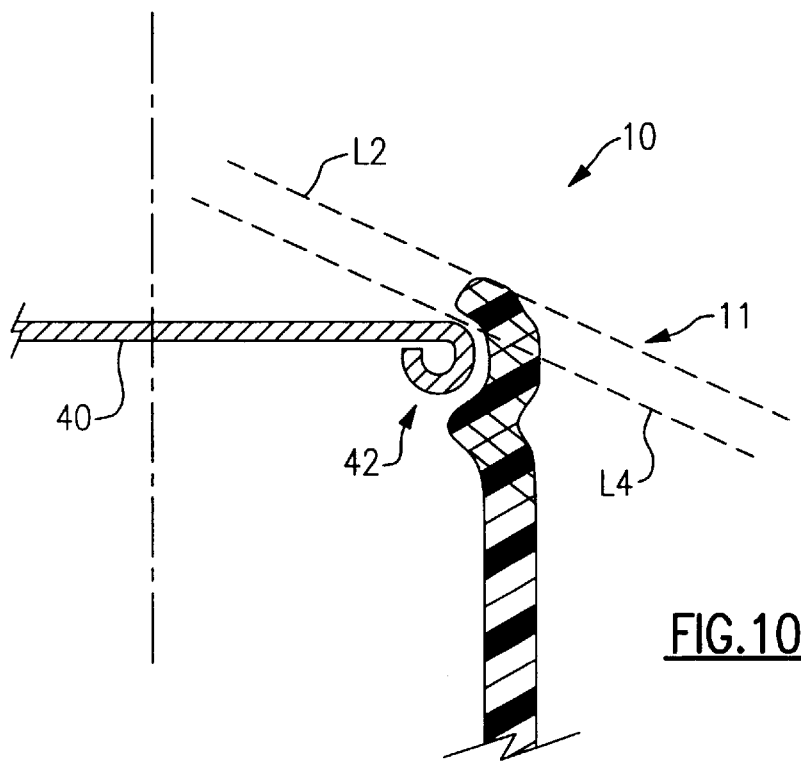
FIG. 10B is a fragmentary cross-sectional view showing a second step in the exemplary embodiment of the present invention.

Turning now to FIGS. 10A and 10B, one of the inventive elements of the present invention and a first embodiment thereof shall be described with reference to an example.

In FIG. 10A, a container or other object 10 is at least partially made from a material capable of retaining a material memory, such as PET. The container 10 has at least one portion 11 that has been stressed or strained such that the strained portion 11 is oriented and therefore retains a memory of its previous, unstrained state. The stress or strain need not only be applied via molecular orientation (at least radial or circumferential and usually biaxial and radial orientation) during stretch blow molding, but may be imparted by another stretching process, the application of some other mechanical force, or the application of energy, as appropriate to the application and type of material used.

In FIG. 10A, a closure insert or other member 40 having a rim portion 42 is placed in contact or proximate the container 10 having at least the one strained circumferential portion or area 11. Subsequent an application of energy to heat the area 11, the strained portion 11 contracts (i.e. tends to returns to its previous state), and engages the rim portion 42, as shown in FIG. 10B. Of course, the rim should be positioned such that the contracting strained portion 11 encounters the rim before the strained portion fully returns to its original, pre-strain condition. If the member 40 is a closure, the container 10 may then be trimmed proximate line L2. Alternatively, it is possible to provide a removable closure by cutting the container proximate line L4, although this would result in there no longer being a permanent, tight seal. Finally, the closure 40 may be disposed proximate a termination of the container 10 before attachment, as illustrated by line L3 in FIG. 10A.

Figure 11:
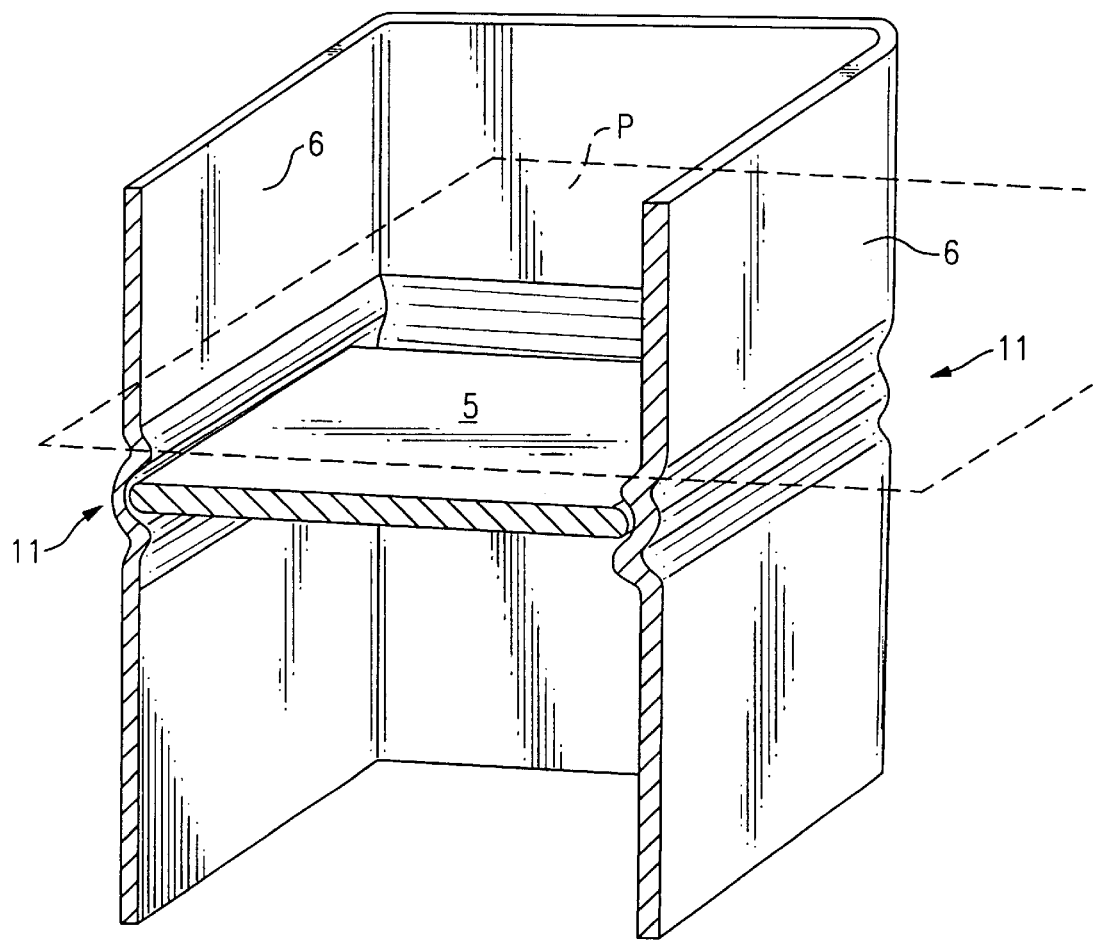
FIG. 11 is a perspective view illustrating one of the inventive elements of the present invention and an additional embodiment thereof.

It should be appreciated that this technique can be used to provide a seal between any container having at least one appropriately oriented portion having a material memory and a closure or other member having any shape. One example of this is shown in FIG. 11, where a cross member 5 is disposed between two opposing walls 6 of a container having, e.g. a square cross-section, each having a strained area or portion 11. If the cross member 5 is a closure, the walls 6 would terminate or be trimmed proximate a plane P. It will be appreciated that only three of four walls defining the containers are shown in FIG. 11 and that other cross-sections having planar or curved walls are contemplated by the present invention.

Figure 12A:
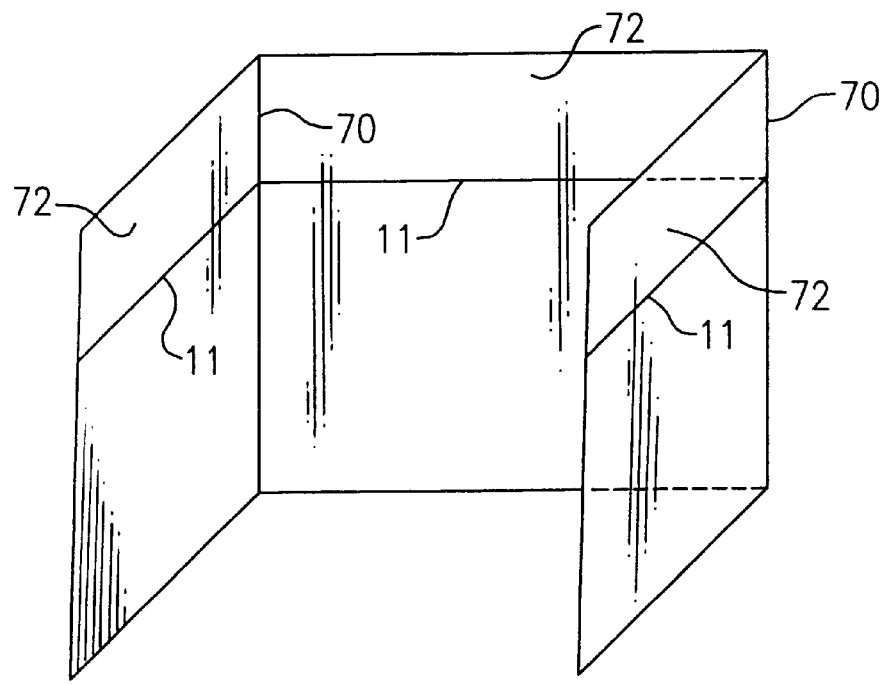
FIG. 12A is a perspective view of another embodiment of the present invention, similar to the embodiment of FIG. 11, in a pre-closure state, and illustrating an additional inventive element of the present invention.
Figure 12B:
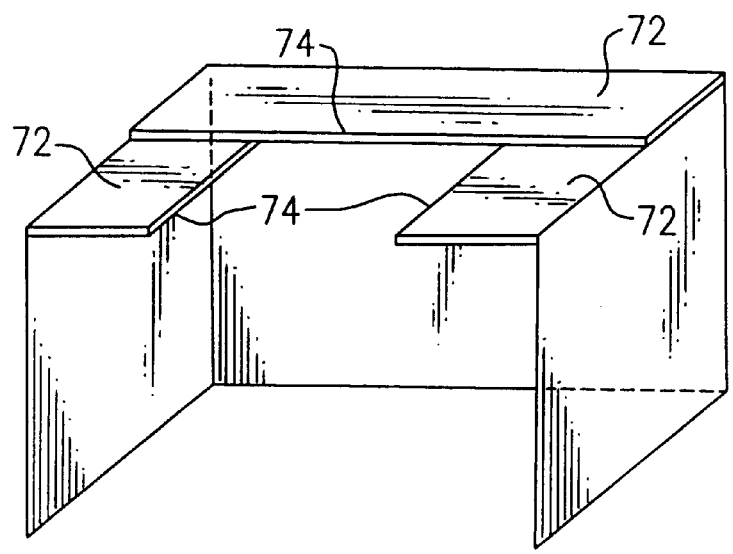
FIG. 12B is a perspective view of the embodiment of FIG. 12A in a post-closure state.

FIGS. 12A and 12B show an additional embodiment of the present invention. Here, the square container of FIG. 11 is provided without the cross member 5. Two corner segments are cut at 70, effectively providing three rectangular flaps 72. In addition, at least the areas 11 proximate the junctions between the flaps and the container proper have laterally directed material memories (e.g. as provided by stretch molding). Energy is subsequently applied to the material memory areas 11, which tend to bend inwardly in response so that the flaps 72 generally fold over, as shown in FIG. 12B. To open the flaps, a user simply pulls upwards on leading edges 74, essentially overcoming the otherwise permanently folded flaps via mechanical force. Although this configuration would not provide a water tight seal, it would be useful for containers to store certain types of goods, e.g. a square tube container for tennis balls.

It should be appreciated that for an actual container a fourth wall would be provided, preferably along with a fourth flap. Of course, it would be possible to provide an effective closure with only a single flap, or more than four flaps (for example, a turret-shaped configuration), depending on the particular application. Also, the flaps could be any shape, e.g. rounded, and the material memory folding process could be facilitated or further controlled by using mechanical presses, guides, or the like.

Figure 13:
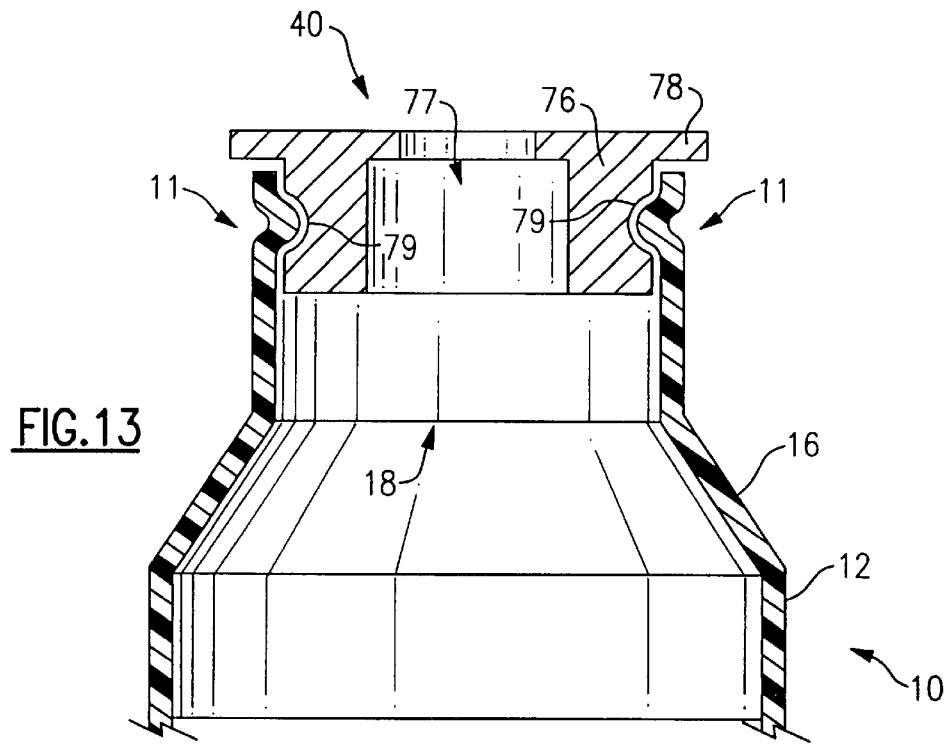
FIG. 13 is a fragmentary cross-sectional view of an additional embodiment of the present invention using a flange-less container.

Turning now to FIG. 13, an additional embodiment is shown wherein the container 10 is provided without an annular flange 20. This is accomplished by cutting the intermediate article of manufacture as shown in FIG. 3 proximate a line L'. In addition, a pre-molded closure 40 is provided. The closure 40 comprises a generally cylindrical body 76 having a product dispensing opening 77 disposed longitudinally therethrough, an annular flange 78 extending around the top of the body 76, and an outwardly facing circumferential groove 79 disposed about a lower portion of the body 76 below the annular flange 78. For assembly, the closure 40 is inserted into the container opening 18, and is supported by the annular flange abutting a top rim of the container 10. The closure 40 is preferably dimensioned to tightly fit within the opening. Then the container is heated and mechanically pressed proximate a stressed/oriented area 11, as was illustrated in FIG. 8. This provides a permanent sealing closure between the closure 40 and the container 10, which may be enhanced by using sealants, gaskets, or the like, as discussed above with respect to other embodiments.

Figure 14:
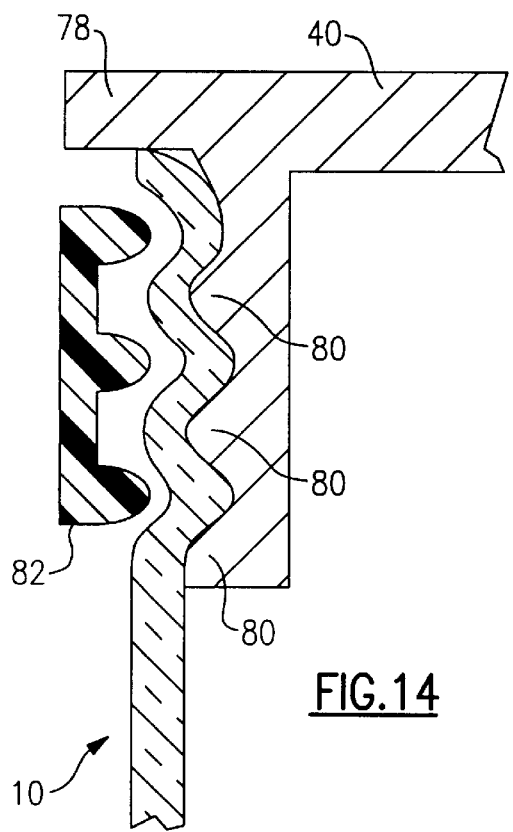
FIG. 14 is a fragmentary cross-sectional view of an additional embodiment of the present invention provided with a screw-on closure.

Finally, FIG. 14 shows a version of the embodiment of FIG. 13 having a removable, pre-formed, screw threaded closure 40. Here, the screw thread on closure 40 has a helical form 80 extending circumferentially around the closure 40. The term "screw thread," as used herein, refers to a continuous or interrupted (by one or more spaces) helical thread, as known to those with skill in the art, to effectuate increased manufacturing tolerances during molding and the like.

The closure is placed into the mouth opening of a flange-less container 10, as was shown in FIG. 13 (for a flanged container as described above). A complementary shaped heating unit 82 or the like is then used to heat the container 10 proximate the thread portions 80 so that the container radially contracts (shrinks) to engage the threads. Once the heated material has cooled sufficiently to form a permanent deformation, the closure 40 may be removed, for example, by gripping the annular flange 78 and twisting appropriately. Appropriate container seal features may be provided.

The engaging threads could be provided with an intermediate seal layer fracturable to allow removal for access to the container.

Since certain changes may be made in the above described memory shrink closure attachment, without departing from the spirit and scope of the invention herein involved, it is intended that all of the subject matter of the above description or shown in the accompanying drawings shall be interpreted merely as examples illustrating the inventive concept herein and shall not be construed as limiting the invention.

LIST OF ELEMENTS 5 cross member
6 walls
10 container generally
11 strained portion of container
12 container body
14 container bottom
16 container top portion
18 container mouth/opening
20 annular flange
22 annular flange horizontal portion
24 annular flange vertical portion
26 annular flange corner
30 preform (FIG. 4)
32 accommodation element (FIG. 5)
40 closure insert
42 closure rim
44 dispensing outlet
46 outlet rim
50 heater/radiant energy source
52 sealant
56 flange extension
58 pressure tool
60 circumferential closure rim groove
62 second pressure tool
64 closure cap
66 closure cap lower sealing lip
68 closure cap pull tab 70 cut corner segments
72 flaps
74 leading edges of flaps
76 cylindrical body of flanged closure
77 dispensing opening
78 annular flange of closure
79 circumferential groove
80 helical form or thread portions
82 heating unit Wherefore, I claim:

1. A method of permanently attaching a closure inside of an opening defined by a container made of a plastics material, comprising the steps of:
   a) providing a container, produced by a blow-molding process, from a preform having a suitable configuration and smaller than the closure, the opening being defined by a tubular wall portion of the container having internal stresses to provide a material memory whereby this portion has a propensity for contracting, toward the configuration and size of the preform, upon relief of internal stresses, of the material memory portion, resulting from the blow-molding process, by heating the material memory portion to a stress relieving temperature;
   b) providing a closure defining a closure periphery sized and shaped to fit within the tubular wall portion defining the opening;
   c) positioning the closure within the tubular wall portion defining the opening of the container with the closure periphery disposed proximate the tubular wall portion; and
   d) heating the tubular wall portion to the stress relieving temperature to relieve the internal stresses, of the material memory of the tubular wall portion resulting from the blow-molding process, sufficiently to cause the tubular wall portion defining the opening to contract, by virtue of relief of these internal stresses, toward the configuration and size of the preform and thereby to cause tubular wall portion defining the opening to engage and conform to the closure periphery to permanently secure and seal the closure within the opening without the need for mechanical force to supplement the action of the material memory.

2. The method of claim 1 in which the step of providing a container provides a container in which the opening is circular.

3. The method of claim 1 further comprising, before the heating step, the step of providing a sealant between the tubular wall portion and the closure periphery whereby once the tubular wall portion defining the opening portion contracts by virtue of the material memory, upon heating of the material memory portion to the stress relieving temperature, an improved seal between the container and the closure periphery is realized.

4. The method of claim 1 wherein the tubular wall portion defining the opening extends axially of the container from a flange and wherein the step of positioning the closure within the opening brings an area of the closure adjacent the closure periphery into contact with the flange with the closure periphery within the axially extending tubular wall portion and proximate thereto, and the heating step allows contraction of the axially extending tubular wall portion to conform to the shape of the closure periphery.

5. The method of claim 4 wherein flange has a material memory and the heating step also causes contraction of the flange consistent with contraction of the axially extending tubular wall portion.

6. The method of claim 4 wherein the axially extending tubular wall portion extends axially of the container sufficiently for the contraction due to said material memory, during the heating step, to cause the axially extending tubular wall portion to contract inwardly over an area of the closure, adjacent the closure periphery, remote from the flange.

7. The method of claim 6 wherein the contraction of the axially extending tubular wall portion over the area of the closure adjacent the closure periphery is aided by a force specifically applied toward the flange in order to ensure strict conformity of the axially extending tubular wall portion with said area of the closure adjacent the closure periphery.

8. The method of claim 1 wherein the closure periphery is divided by an outwardly facing groove and the method further comprises the step of pressing the tubular wall portion into the closure periphery groove to aid the contraction of the tubular wall portion, by virtue of relief of the internal stresses of the material memory, into the groove while the tubular wall portion is undergoing relief of these internal stresses during the heating step, whereby a seal between the closure periphery, the groove and the container is realized.

9. The method of claim 8 further comprising, before the heating step, the stop of providing a sealant between the tubular wall portion and the outwardly facing groove, and wherein the pressing step presses the tubular wall portion into the groove with the sealant therebetween to aid contraction of the tubular wall portion while undergoing relief of the internal stresses during the heating step, whereby an enhanced seal between the groove and the container is realized.

10. A method of closing a blow-molded container, defining an axis, using material memory of a plastics material from which the container is constructed, comprising the steps of:
    a) blow-molding the container, defining a circumference of an opening, from a preform by i) blow-molding an intermediate article, consisting of a body and an accommodation element, made of the plastics material, the accommodation element comprising a flange extending outwardly from and normal to the axis and an axially extending wall portion extending upwards from an outer edge of the flange, the flange and axially extending wall portion defining an inwardly facing, circumferential corner disposed about the opening, the material of the body defining the opening adjacent the accommodation element being biaxially oriented, as a result of the blow-molding, and ii) severing the accommodation element from the body above the axially extending wall portion in order to provide the opening with its circumference defined by the flange and the axially extending wall portion, at least the axially extending wall portion having material memory as a result of the blow-molding the intermediate article from the preform, the severed body forming the container;
    b) providing a closure defining a closure periphery;
    c) positioning the closure in the container opening such that at least a portion of the closure adjacent the closure periphery rests in the corner on the flange within the axially extending wall portion; and
    d) heating the material memory portion of the container adjacent the opening sufficiently to cause this portion to contract by virtue of the material memory of this portion to engage and conform to the closure periphery to permanently secure and seal the axially extending portion about the closure with the closure periphery resting in the corner.

11. A container and closure combination when made by a method according to claim 1.

12. A container and closure when made by a method according to claim 10.

* * * * *